United States Patent
Genero et al.

[11] Patent Number: 6,151,828
[45] Date of Patent: *Nov. 28, 2000

[54] INSECT FEEDING STATION

[76] Inventors: Claude Paul Genero; Gail Ann Genero, both of 30 Phillips St., WA 6062 Dianella, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/178,013

[22] Filed: Jan. 6, 1994

Related U.S. Application Data

[63] Continuation-in-part of application No. PCT/AU92/00340, Jul. 10, 1992.

[30] Foreign Application Priority Data

| Jul. 10, 1991 | [AU] | Australia | PK7140 |
| Feb. 8, 1993 | [AU] | Australia | PL7135 |

[51] Int. Cl.⁷ .............................................. A01M 1/20
[52] U.S. Cl. ............................................. 43/131; 43/121
[58] Field of Search ........................ 43/131, 121; 206/268

[56] References Cited

U.S. PATENT DOCUMENTS

| 1,015,141 | 1/1912 | Crandall | 43/131 |
|---|---|---|---|
| 1,047,282 | 12/1912 | Penn | 43/131 |
| 1,119,502 | 12/1914 | Evans | 43/131 |
| 1,328,936 | 1/1920 | Watson | 43/131 |
| 1,566,179 | 12/1925 | Wilmarth . | |
| 2,772,511 | 12/1956 | Tomasek . | |
| 2,837,861 | 6/1958 | Graham . | |
| 2,860,445 | 11/1958 | Yates | 43/131 |
| 3,017,717 | 1/1962 | Caubre . | |
| 3,122,857 | 3/1964 | Yates | 43/131 |
| 3,124,277 | 3/1964 | Helland | 43/131 |
| 3,324,590 | 6/1967 | Richardson . | |
| 3,517,454 | 6/1970 | Query | 43/131 |
| 3,619,934 | 11/1971 | Tunstall | 43/131 |
| 3,908,905 | 9/1975 | Von Philipp et al. . | |
| 4,065,872 | 1/1978 | Patton | 43/131 |
| 4,152,862 | 5/1979 | Mohiuddin | 43/121 |
| 4,277,907 | 7/1981 | Ernest . | |
| 4,375,732 | 3/1983 | Waast | 43/131 |
| 4,485,582 | 12/1984 | Morris . | |
| 4,563,836 | 1/1986 | Woodruff . | |
| 4,658,536 | 4/1987 | Baker | 43/131 |
| 4,746,033 | 5/1988 | Morellini | 43/131 |
| 5,048,218 | 9/1991 | Stewart | 43/131 |
| 5,237,774 | 8/1993 | Warner | 43/131 |

FOREIGN PATENT DOCUMENTS

| 395954 | 11/1990 | European Pat. Off. . |
| 137481 | 1/1920 | United Kingdom . |

*Primary Examiner*—Kurt Rowan

[57] ABSTRACT

An insect feeding station (10) for administering a fluent substance such as a poisonous liquid bait to ants and other insects. The feeding station (10) comprises a housing (11) having an interior region (21) adapted to contain the fluent substance. The housing (10) has an opening (27) through which insects can enter and leave the interior region (21), and an internal structure (43) within the interior region (21) for facilitating access by the insects to the substance. The internal structure (43) may take various forms but typically is of a construction which is adapted to at least be partially covered by the substance when the latter is first introduced into the interior region (21) and which is progressively exposed as the substance is consumed. With this arrangement, the portion of the internal structure which is exposed provides a zone away from the liquid bait for supporting the bodies of dead insects. Thus the bodies are "dry-docked" on the internal structure from where they can be retrieved.

32 Claims, 7 Drawing Sheets

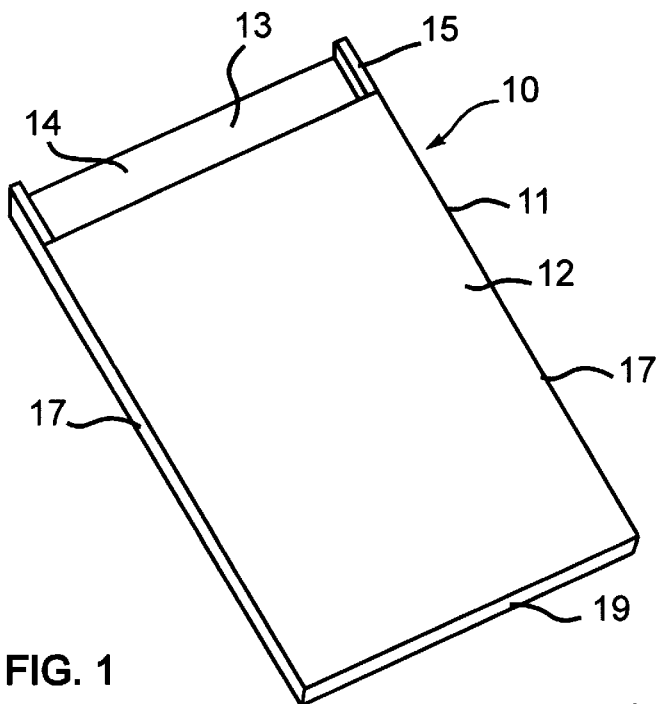
FIG. 1
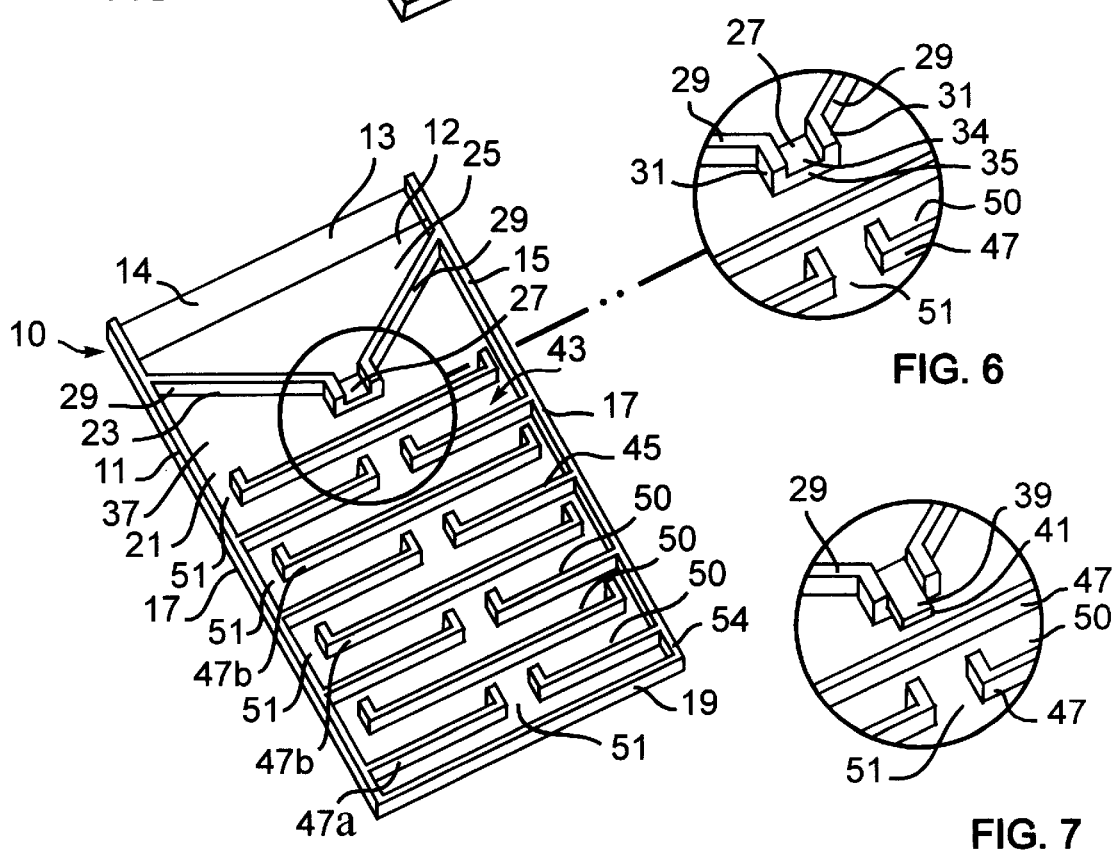
FIG. 6
FIG. 2
FIG. 7

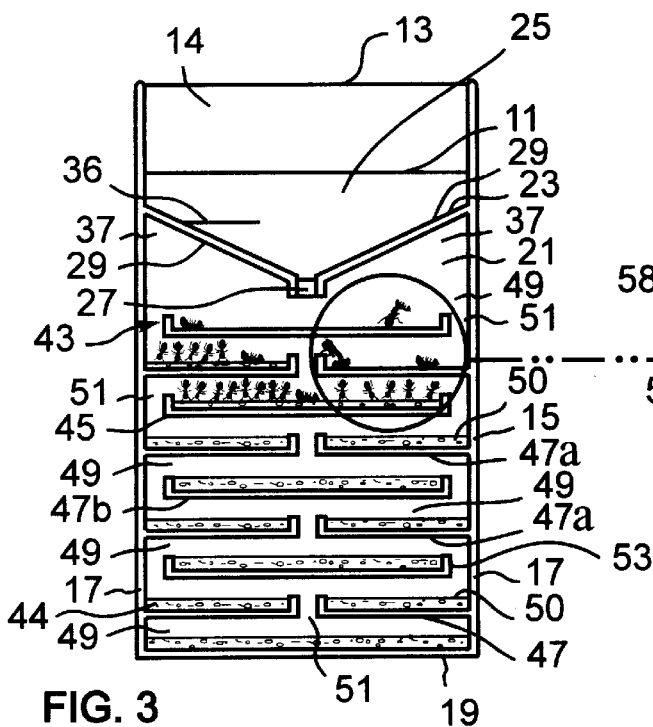

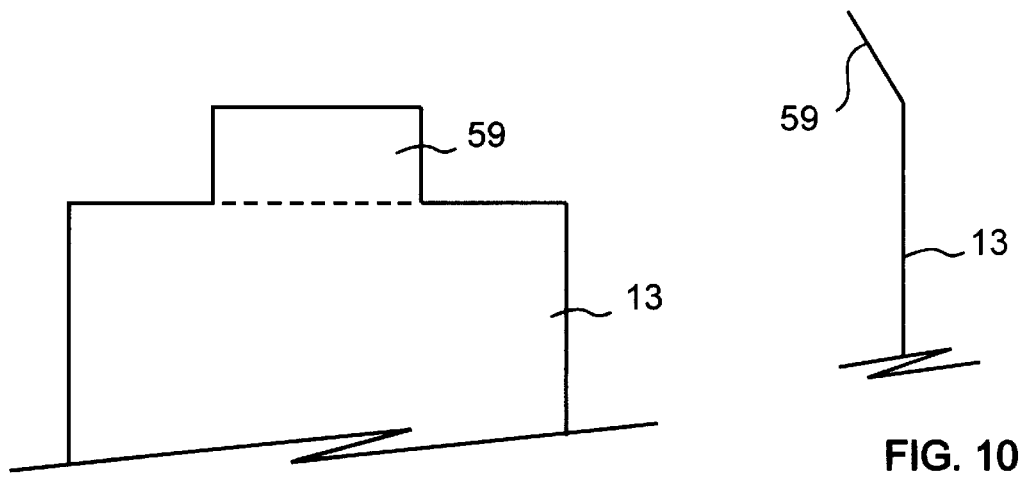
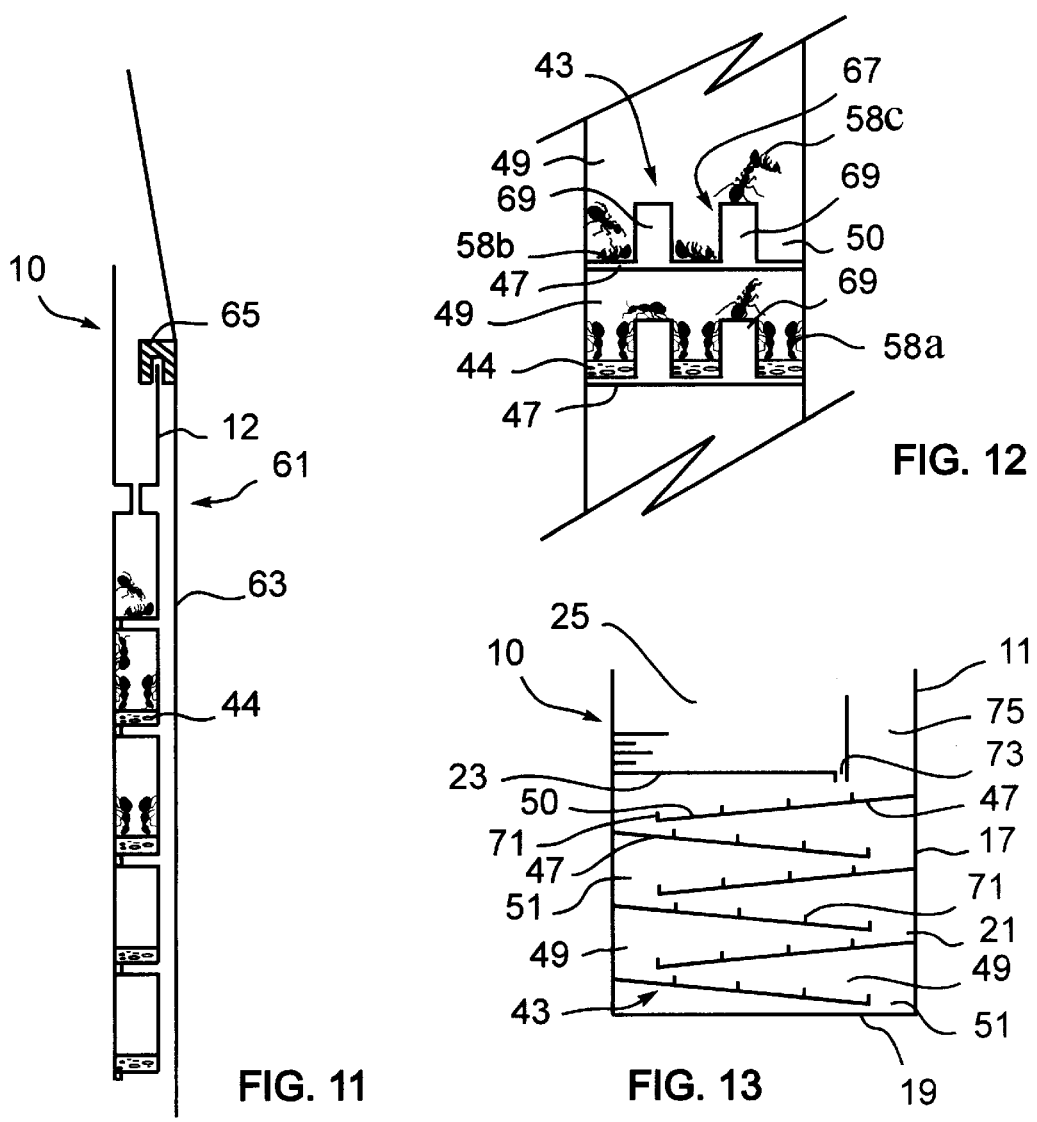

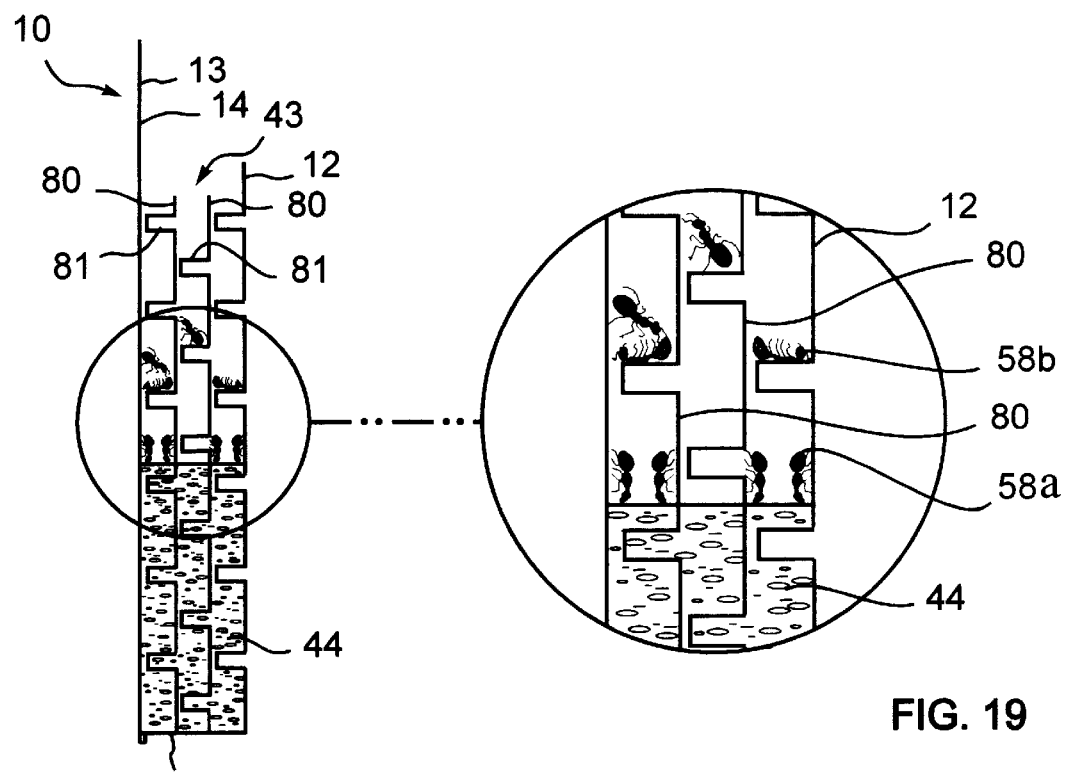
FIG. 18
FIG. 19
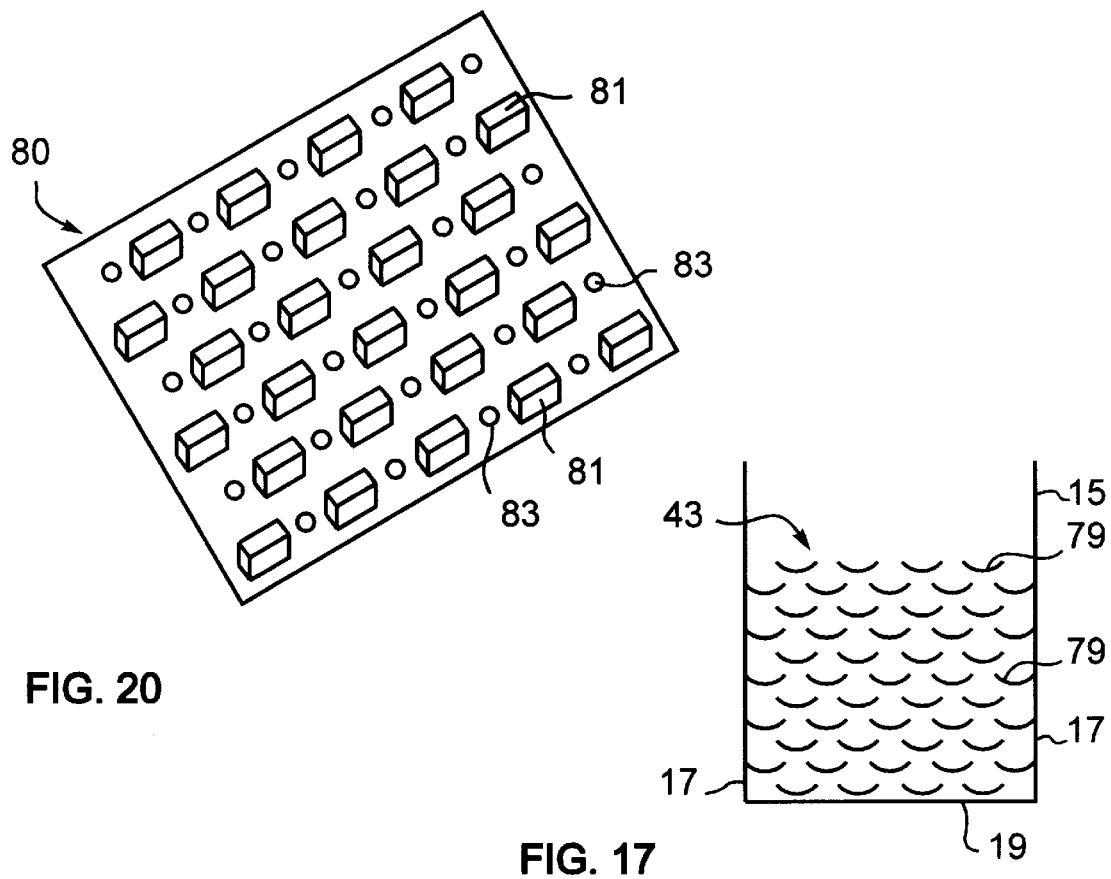
FIG. 20
FIG. 17

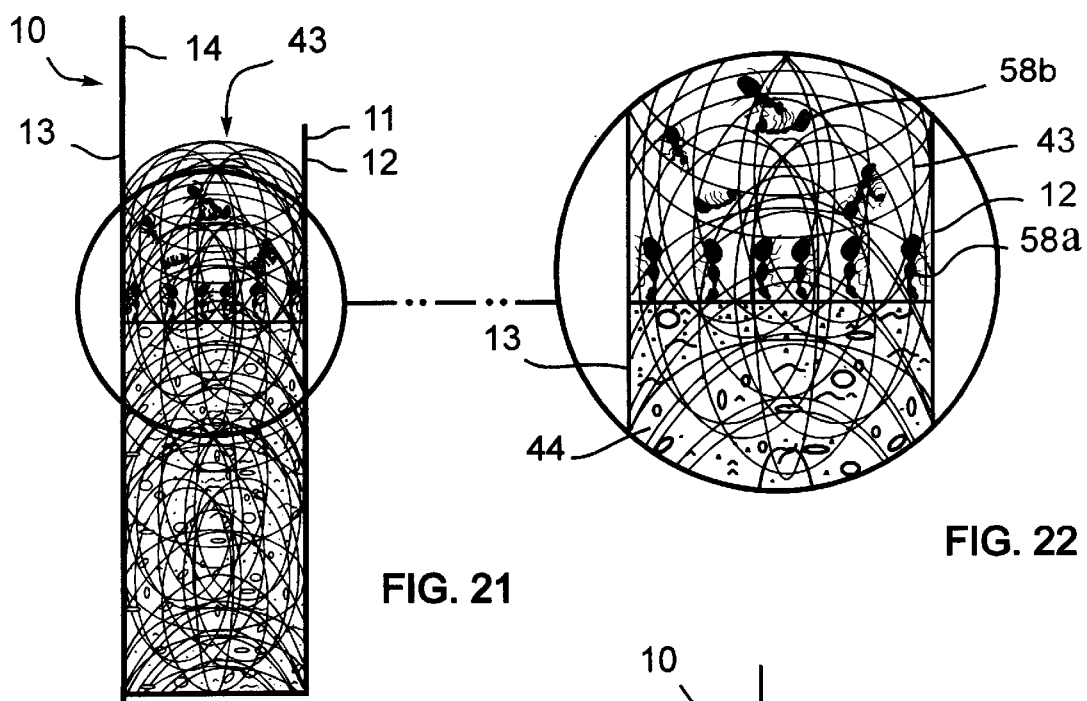
FIG. 21
FIG. 22
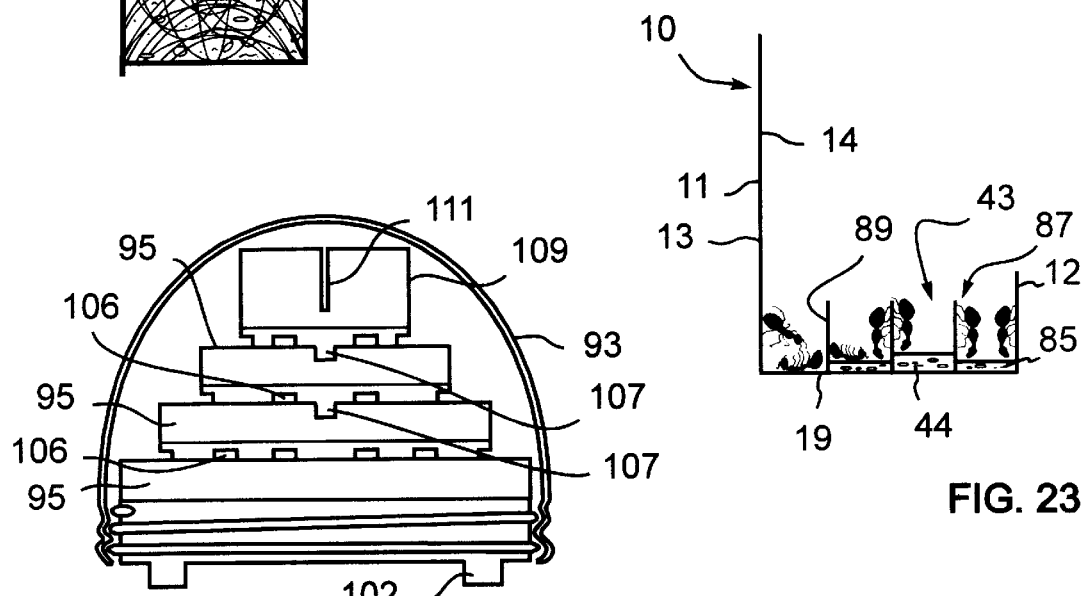
FIG. 24
FIG. 23
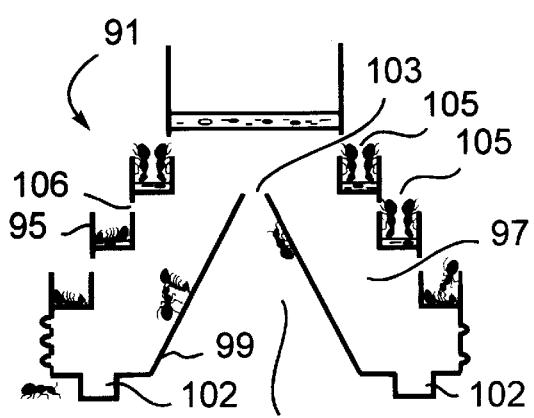
FIG. 25

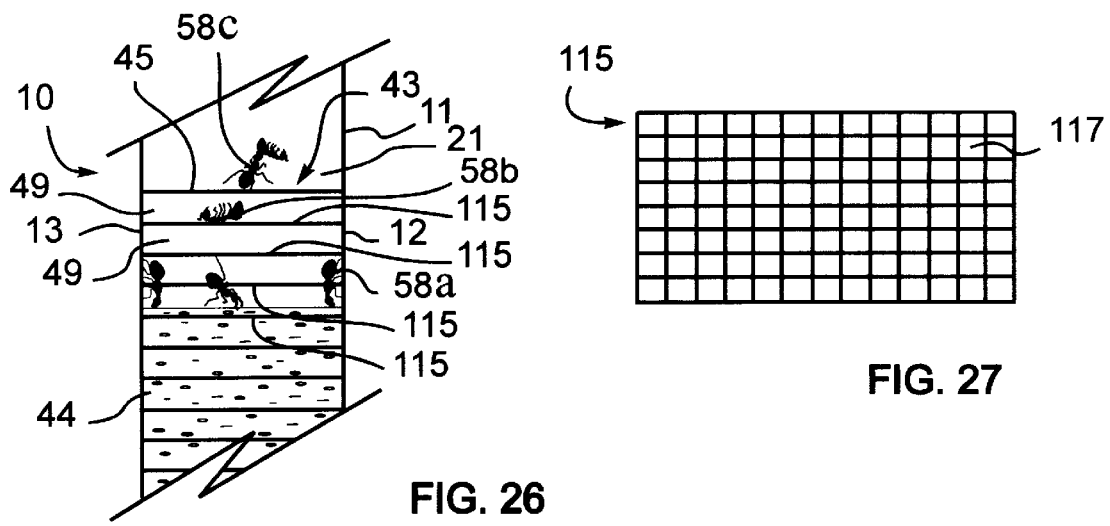
FIG. 26
FIG. 27
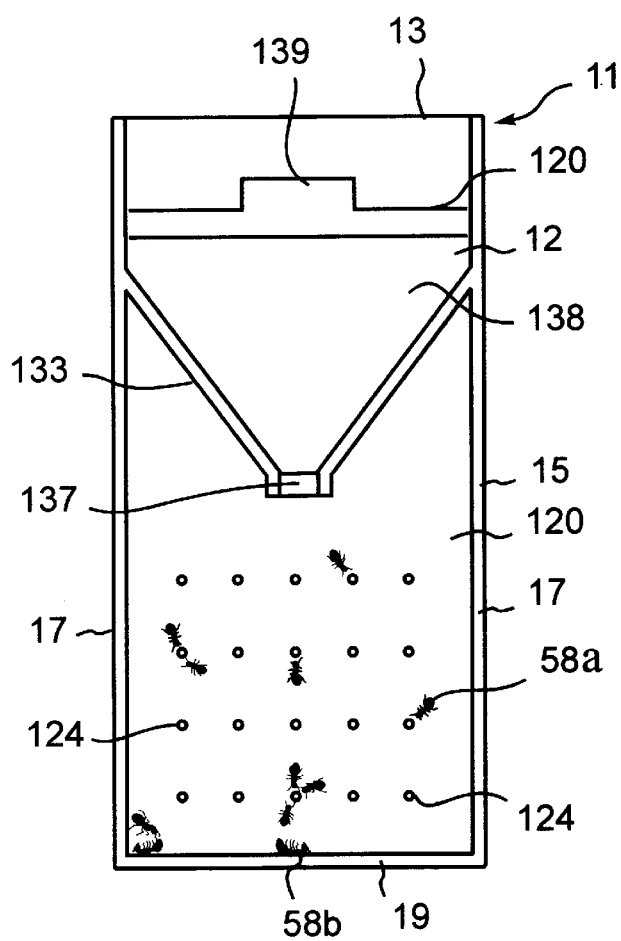
FIG. 28
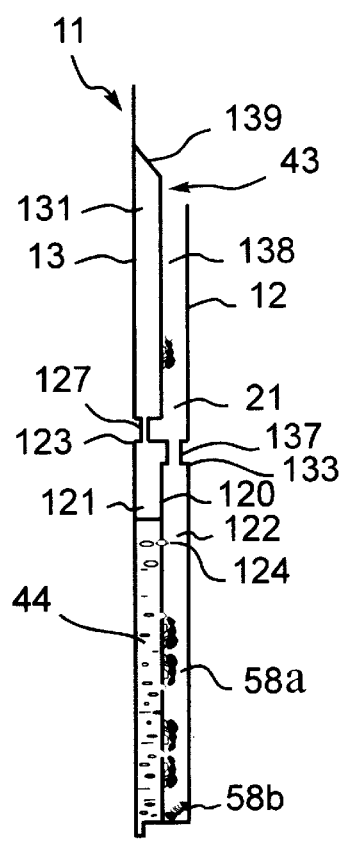
FIG. 29

INSECT FEEDING STATION

RELATED APPLICATION

This application is a continuation-in-part of International Application No. PCT/AU92/00340 filed Jul. 10, 1992 designating the United States of America.

BACKGROUND OF THE INVENTION

This invention relates to an insect feeding station for administering a substance in fluent form (such as liquid, powder or granules) to insects, particularly crawling insects such as ants.

The invention is particularly suitable for administering a toxic substance to such insects for the purposes of eradicating them.

A common way of eradicating ants is to feed them with a bait comprising a toxic substance such as a liquid mixture of a slow-acting poison and matter attractive to the ants. Ants take portions of the toxic bait and return to their nest where the toxic bait is transferred to other ants, as is common practice in the feeding regime of ants. Ants which feed on the poison eventually die. Other ants devour the dead ants, so further transmitting the poison from ant to ant.

While feeding ants with a toxic bait is an effective way of eradicating them, there can be problems associated with presentation of the bait to ants. It is common to use a toxic bait in liquid form and present it to ants in a feeding station comprising a broad, shallow vessel such as a saucer. The feeding station is positioned in the area of the ant infestation, preferably near the nest of the ant colony or on a track followed by ants from the colony.

The use of a broad, shallow vessel, such as a saucer, as a feeding station can create problems. One problem is that the toxic bait is readily accessible to young children and domestic animals. Another problem is that ants can only obtain access to the liquid bait around the perimeter of the bait; they cannot obtain access to the inner region of the expanse of the liquid. Furthermore, as ants travel back and forth between their nest and the bait, some of them inevitably die at the feeding station and their bodies are located around the perimeter of the liquid bait. While some of the bodies are removed by other ants and returned to the nest where they can be devoured, other bodies may be difficult to remove from the liquid bait because of the usually sticky nature of the bait. The bodies which are difficult to remove are usually left at the feeding station. This results in an accumulation of bodies at the feeding station around the perimeter of the bait, the perimeter being the only access to the body of toxic liquid for ants. The accumulating bodies make it progressively more difficult and eventually impossible for other ants to gain access to the bait. The difficulty in gaining access to the bait soon deters other ants from visiting the feeding station. This results in the feeding station becoming ineffective, even though there may be a considerable amount of the bait remaining. Additionally, because ants can only feed on the liquid bait at its perimeter, the rate at which the bait can be consumed is limited. The resultant delay in consuming the bait may lead to its deterioration in effectiveness even before ants are deterred from the bait because of difficulty with access. The deterioration of the bait arises primarily through exposure to the surrounding environment, particularly as a result of the broad surface area of liquid which is exposed to the air. As the liquid deteriorates its surface hardens and becomes glazed. The hardened surface is not appealing to ants and deters them.

SUMMARY OF THE INVENTION

The present invention seeks to provide an insect feeding station which can be used to administer a substance to insects and in such circumstances addresses at least some of the problems outlined above.

In one form the invention resides in an insect feeding station for administering a fluent substance to insects, comprising a housing having an interior region adapted to contain the substance, means for defining an opening in the housing through which insects can enter and leave the interior region, and an internal structure within the interior region for facilitating access by the insects to the substance.

This arrangement provides a way for insects to obtain access to the inner section of the exposed surface of the substance, particularly in cases where the substance is in liquid form. Additionally, the internal structure may comprise means for inhibiting the accumulation of bodies of insects, which may be either still alive or dead, in the substance as the latter is consumed. The internal structure may be of an open construction with an interior within which the fluent substance can be received and through which insects can move to obtain access to the substance.

To facilitate access by insects to the substance, the internal structure is preferably of a construction which is adapted to be at least partially covered by the substance when the latter is first introduced into the interior region and which is progressively exposed as the substance is consumed.

In circumstances where it is desired to kill certain insects such as ants, the substance selected for introduction into the interior region should be toxic to such insects. Where the ant colony is extensive, it may take days or even several weeks to eradicate the ants.

Conveniently, the substance is in liquid form.

In one arrangement the means for defining an opening may simply comprise an aperture in the housing. The aperture may be provided with a closure which is removable to allow the movement of insects into and out of the interior region. In another arrangement means for defining an opening may comprise a portion of housing which can be ruptured to form the opening.

There may be more than one such opening, if desired.

Because the internal structure is progressively exposed as the substance is consumed, insects can obtain access to the unconsumed portion of the substance even though other parts of the internal structure may be occupied by the bodies of dead insects. The internal structure may serve to prevent contamination of the toxic substance by bodies of dead ants. This occurs because the internal structure can retain the bodies of dead ants in place while the level of the toxic substance progressively falls as it is consumed. Thus, the bodies of dead ants are separated from the remaining toxic substance.

One form of the internal structure may comprise at least one upstanding formation within the interior region for parting the substance. In one arrangement, the upstanding formation may comprise a wall structure dividing the interior region into a plurality of reservoirs each adapted to contain a portion of the substance. The wall structure may comprise one or more walls. The reservoirs formed by the wall structure are preferably elongated, each being thin and shallow in relation to its length.

Conveniently, the elongated reservoirs are disposed in side by side relationship.

In another arrangement, the upstanding formation may comprise a plurality of spaced ribs onto which the insects can climb to gain access to the substance.

The separation of dead bodies from the toxic liquid clears at least some of the bodies from the surface of the liquid and so ensures that there is access to the toxic liquid for other ants. The bodies which have been separated from the liquid can be retrieved later by other ants.

Another form of the internal structure may comprise an open porous structure having interstices through which the insects can pass. Conveniently, the open porous structure is formed by a mass of fibrous material.

Another form of the internal structure may comprise a partition structure dividing the interior region into a plurality of feeding chambers one above another.

The partition structure may in one arrangement comprise a plurality of partitions spaced vertically with respect to one another. A passage may extend between adjacent feeding chambers so that insects can pass therebetween. The passage between adjacent feeding chambers may comprise an opening associated with each partition. The opening may be formed in the partition or may be located at a side or end thereof.

The partitions may each be adapted to define a reservoir arrangement for containing a portion of the substance. The reservoir arrangement on each partition may comprise a plurality of reservoirs so arranged so that surplus substance can flow from one reservoir to another.

The partition structure may in another arrangement comprise a plurality of perforated partitions in spaced apart relationship, the perforations being of a size through which insects can pass.

Another form of internal structure may include a plurality of lateral protrusions. The lateral protrusions may be so arranged that feeding chambers are defined therearound.

Conveniently, the housing comprises a front wall and a rear wall in spaced apart relationship.

The housing may define a plurality of interior regions which are positioned one in front of another and each of which has a respective one of the internal structures.

Where the housing has only one interior region, the latter is defined between the front and back walls. Where the housing has a plurality of interior regions positioned one in front of another, such regions may be disposed between the front and rear walls and separated one from another by internal walls.

In the case where the internal structure comprises a partition structure, the or each partition of the partition structure preferably extends between the respective walls defining the particular interior region.

Another form of internal structure may comprise a plurality of discrete reservoirs. The reservoirs may be arranged so that surplus substance can flow from one reservoir to another.

The interior region may have a top wall, with an upper chamber being defined in the housing above the top wall.

Conveniently, the means defining an opening by which insects can enter and leave the interior region comprises an aperture formed in the top wall.

The upper chamber may be adapted to contain a quantity of the substance and the upper chamber may have means through which the substance contained therein can pass into the interior region. Such means may comprise the opening through which insects can pass.

The fluent substance may be introduced into the housing by a user or the feeding station may be delivered for sale or otherwise provided to the user with the substance contained therein.

In another arrangement, the internal structure comprises an internal wall which divides the interior region into first and second chambers, the first chamber being adapted to contain fluent substance in liquid form and the second chamber being accessible to insects, and at least one small hole in the internal wall extending between the two chambers whereby in use liquid in the first chamber can ooze through the hole into the second chamber.

Preferably, the liquid oozing through the hole forms a globule on the internal wall within the second chamber.

In another form the invention resides in an insect feeding station for administering a toxic fluent substance to insects, comprising a housing having an interior region, means for defining an opening in the housing through which insects can enter and leave the interior region, and an internal structure within the interior region, the internal structure being of a construction which is at least partially covered by the fluent substance when the latter is first introduced into the interior region and which is progressively exposed as the fluent substance is consumed, the portion of the interior structure which is exposed providing a zone away from the fluent substance which can support the bodies of dead insects.

Preferably, the internal structure functions to strain the surface of the fluent substance as it progressively falls to remove bodies of dead insects therefrom. In this way the bodies are effectively "dry-docked" on the internal structure from where they can later be retrieved, for instance by other insects.

In still another form the invention resides in an insect feeding station for administering a toxic fluent substance to insects, comprising a housing having an interior region adapted to contain the fluent substance, means for defining an opening in the housing through which insects can enter and leave the interior region, and an internal structure within the interior region, the internal structure being of a configuration which ensures that insects always has access to the substance contained within the interior region.

In still another form the invention resides in a feeding station for administering a substance to animals, comprising an interior region which animals can enter and which is adapted to contain the substance, an internal structure within the interior region for facilitating access by the animals to the substance, at least part of said internal structure being located within the area where in use the substance is contained said at least part of the internal structure being of a construction which is adapted to be at least partially covered by the substance when the substance is first introduced into the interior region and which is progressively exposed as the level of the substance at which animals feed progressively falls upon consumption of the substance, said at least part of the internal structure comprising means for inhibiting the accumulation of bodies of animals in the substance as the latter is consumed by the animals.

The animals may be of any suitable form such as insects.

In yet another form the invention resides in a feeding station comprising an interior region adapted to contain a substance, means for defining an opening in the feeding station through which consumers of said substance can enter the interior region, and an internal structure within the interior region for facilitating access by the consumers to the substance, at least part of said internal structure being located within the area where in use the substance is contained, said at least part of the internal structure being of a construction which is adapted to be at least partially covered by the substance when the latter is first introduced into the interior region and which is progressively exposed as the level of the substance at which consumers feed progressively falls upon consumption of the substance, said at least part of the internal structure comprising means for inhibiting the accumulation of bodies of consumers in the substance as the latter is consumed by the consumers.

The consumers may be any suitable form of animal such as insects.

BRIEF DESCRIPTION OF THE DRAWINGS

The invention will be better understood by reference to the following description of several specific embodiments thereof as shown in the accompanying drawings in which:

FIG. 1 is a schematic perspective view of an insect feeding station according to a first embodiment;

FIG. 2 is a view similar to FIG. 1 with the exception that the front wall thereof is depicted in its transparent condition to reveal the interior of the insect feeding station;

FIG. 3 is a front elevational view of the insect feeding station, with a toxic substance shown contained within the feeding station and ants feeding on the substance;

FIG. 4 is a cross-sectional view of the insect feeding station of FIG. 3;

FIG. 5 is a fragmentary view, on an enlarged scale, of part of the interior of the insect feeding station;

FIG. 6 is a fragmentary view, on an enlarged scale, of further part of the interior of the insect feeding station, showing in particular detail of an access opening through which insects can enter and leave the interior of the feeding station;

FIG. 7 is a fragmentary view of a modified form of the access opening shown in FIG. 6;

FIG. 8 is a fragmentary view of the insect feeding station mounted onto a wall in close proximity to a track followed by ants with a trail extending between the track and the insect feeding station;

FIG. 9 is a fragmentary elevational view of a modified form of rear wall for the insect feeding station of the first embodiment;

FIG. 10 is a fragmentary side view of the rear wall;

FIG. 11 is a side view of the insect feeding station of the first embodiment fitted with a cover;

FIG. 12 is a fragmentary view of an insect feeding station according to a second embodiment;

FIG. 13 is a schematic view of an insect feeding station according to a third embodiment;

FIG. 17 is a schematic front view of an insect feeding station according to a sixth embodiment;

FIG. 18 is a schematic side view of an insect feeding station according to a seventh embodiment.

FIG. 19 is a fragmentary view on an enlarged scale of the insect feeding station of FIG. 18;

FIG. 20 is an isometric view of part of the insect feeding station of the seventh embodiment;

FIG. 21 is a schematic side view of an insect feeding station according to an eighth embodiment;

FIG. 22 is a fragmentary view of the insect feeding station of FIG. 21;

FIG. 23 is a schematic side view of an insect feeding station according to a ninth embodiment;

FIG. 24 is a schematic elevational view of an insect feeding station according to a tenth embodiment;

FIG. 25 is a sectional view of a portion of the insect feeding station of FIG. 24;

FIG. 26 is a fragmentary view of an insect feeding section according to an eleventh embodiment;

FIG. 27 is a plan view of a perforated partition which forms part of the feeding station;

FIG. 28 is an elevational view of an insect feeding station according to a twelfth embodiment; and FIG. 29 is a cross-sectional view of the insect feeding station of FIG. 28.

DESCRIPTION OF THE PREFERRED EMBODIMENTS

Figure 14:
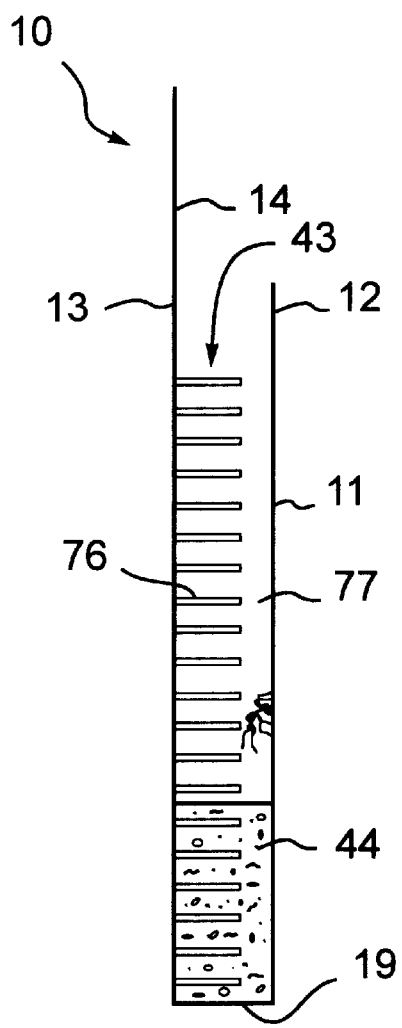
FIG. 14 is a schematic side view of an insect feeding station according to a fourth embodiment.

The various embodiments shown in the drawings are each directed to a feeding station for administering a toxic substance to ants for the purpose of eradicating them. The substance is a toxic liquid comprising a mixture of a slow acting poison and matter which is attractive to ants.

Referring to FIGS. 1 to 11, the insect feeding station 10 according to the first embodiment comprises a housing 11 having a front wall 12 which is transparent and a rear wall 13 spaced apart from the front wall, the rear wall extending upwardly beyond the front wall to provide an exposed rear portion 14. A peripheral wall 15 extends between the front wall 12 and the rear wall 13. The peripheral wall 15 forms the sides 17 and the bottom 19 of an interior region 21 defined within the housing, the interior region being disposed between the front and rear walls. The interior region 21 has a top wall 23 which extends between the two sides 17 in one direction and between the front and rear walls 12 and 13 respectively in another direction.

The top wall 23 is disposed below the upper edge of the front wall with the result that an upper chamber 25 is formed in the housing within the region above the top wall 23. The top end of the upper chamber 25 is open. The top wall 23 is configured so that it slopes downwardly and inwardly to a central opening 27 defining an aperture which communicates with the interior region 21. With this arrangement, the top wall 23 is defined by two sloping sections 29, each of which terminates at a depending flange 31 at the periphery of the opening. The central opening 27 is also disposed within a constriction 33 formed in the front and rear walls, as best seen in FIG. 4. The constriction 33 has opposed inner faces 34 which define the sides of the central opening 27. With this arrangement, steps 35 are defined between the sides 34 of the central openings 27 and the inner surface of the front and rear walls 12, 13.

The central opening 27 is of such a size that ants can enter and leave the interior region 21 through it via the upper chamber. The toxic substance in liquid form for use in eradicating ants can also be introduced into the interior region 21 through the central opening 27. The toxic liquid is poured into the upper chamber 25 from where it can drain into the interior region 21 through the central opening. A marking 36 associated with the upper chamber 25 provides a visual indication of the amount of toxic liquid which should be poured into the upper chamber 25 to fill the interior region as will be described later.

The top wall 23 is of a construction which inhibits egress of toxic liquid from the inner region 21 in the event that the housing is tipped sideways or inverted. In such a situation, the toxic liquid flows into, and is contained within, the upper part 37 of the inner region 21 defined between the sides 17 and the sloping sections 29 of the top wall 23. The depending flanges 31 and the steps 35 also assist in containing the toxic liquid within the interior region.

A modified form of central opening 27 is shown in FIG. 7 of the drawings. In the modified form, the central opening includes a tubular portion 39, the internal passage 41 of which provides the communication between the upper chambers 25 and the interior region 21. A liquid seal exists between the front and rear walls 12, 13 and the tubular portion 39 so that the passage within the tubular portion provides the only path for communication between the upper chamber 25 and the interior region 21.

The housing 11 has an internal structure 43 within the interior region 21. The internal structure 43 is adapted to facilitate access of ants to the toxic liquid contained within the interior region. In this regard, the internal structure is adapted to be at least partially covered by the toxic liquid introduced into the interior region 21 and progressively exposed as the substance is consumed by the ants. In the drawings, toxic liquid contained within the interior region is designated by reference numeral 44.

In this first embodiment, the internal structure comprises a partition structure 45 having a plurality of partitions 47 spaced vertically with respect to one another. The partitions 47 divide the interior region 21 into a plurality of feeding chambers 49 one above another.

An opening 51 is associated with each partition 47 so that insects and toxic liquid can pass between the feeding chambers 49. For some partitions 47*a*, the opening 51 is formed centrally in the partition and the partition extends to the sides 17 of the interior region 21. For other partitions 47*b*, there are two openings 51 located at the ends of the partition. With the latter arrangement, the partitions 47*b* do not extend to the sides 17 of the interior region and the openings 51 are defined between the ends of the partitions and the sides 17.

Each partition extends between the front and rear walls 12 and 13 respectively and is configured to define a shallow reservoir 50 for containing a portion of the toxic liquid introduced into the interior region 21. For this purpose upstanding lips 53 are provided on the partition 47 at location adjacent the openings 51. The lips 53 provide weirs over which surplus toxic liquid can flow. The bottom section of the interior region 21 also constitutes one of the reservoirs 50.

The partitions 47*a* and 47*b* are arranged alternately so that each opening 51 is disposed above one of the reservoirs. In this way, toxic liquid introduced into the interior region can progressively cascade from one reservoir to the next, filling each reservoir in turn. The marking 36 provides an indication as to the quantity of toxic liquid which should be introduced into the upper chamber 25 to fill all of the reservoirs 50 within the interior region.

In this embodiment, the housing 11 is formed in two parts which are bonded together, the first part comprising the front wall 11 and the second part comprising the rear wall 13, the peripheral wall 15 and the internal structure 43. The two parts can be formed by way of a vacuum forming process and bonded together along bond lines 54 at the peripheral wall 15, the top wall 23 and the partitions 47. The bond between the two parts may be of any suitable form such as plastic welding and provides a liquid seal along the bond lines.

Operation of the insect feeding station according to the first embodiment will now be described with particular reference to FIGS. 3 and 5 of the drawings in which ants are identified by reference numeral 58 and in particular ants feeding on the toxic liquid are identified by reference 58*a*, bodies of dead ants are identified by reference 58*b* and ants retrieving bodies of dead ants are identified by reference 58*c*.

To use the insect feeding station for the purpose of eradicating a colony of ants, the feeding station 10 is mounted on a wall in close proximity to a track along which ants 58 from the colony travel to and from their nest. The feeding station can be mounted on the wall in any suitable way such as by means of a small mass of adhesive putty 55, as shown in FIG. 8. The putty 55 is pressed into adhesive contact with the wall and the rear wall 13 of the housing 11 is pressed into adhesive contact with the putty, leaving a portion of the putty exposed to provide a ramp over which a trail 57 of the toxic liquid or other material attractive to ants is laid between the ant track and the opening 27 in the feeding station for the purpose of diverting the ant track to the feeding station. Ants 58*a* enter the uppermost feeding chamber 49 within the feeding station through the opening 27 and commence to consume the toxic liquid contained in the uppermost reservoir. The ants do not advance beyond the uppermost feeding chamber while there is sufficient toxic liquid in the uppermost reservoir for them. Because of the shallow nature of the uppermost reservoir, the contents of the reservoir can be consumed before bodies of dead ants 58*b* accumulate to an extent that would be obstructive to other ants. Once the toxic liquid in the uppermost reservoir has been consumed, ants 58*c* can then retrieve many of the dead bodies and return them to the nest where they can be devoured. This provides another way in which the poison is transmitted from ant to ant in the colony. The retrieval of bodies of dead ants is particularly useful in the operation of the feeding station as it prevents clogging of the feeding station, and keeps the feeding station clean and ready for further use.

Further ants from the colony then progress to the next feeding chamber via the opening 51 and commence to consume the toxic liquid contained in its reservoir. The cycle is repeated until either the ant colony is eradicated or all of the toxic liquid is consumed. In the latter case, the eradication procedure can be continued by simply pouring a further quantity of toxic liquid into the feeding station so as to again fill the reservoirs. At no stage of the eradication procedure does the feeding station become clogged with bodies of dead ants and so remaining toxic liquid is always accessible to ants from the colony.

Because of the transparent nature of the front wall 12, the eradication procedure can be viewed and monitored as required.

If the location at which the insect feeding station is such that it is not desirable to lay a trail 57 of material attractive to ants on the wall, the material can be confined to the exposed portion 14 of the rear wall 13 of the housing. Provided that the exposed portion 14 of the rear wall is located sufficiently close to the ant track, ants will still be attracted to the feeding station.

As shown in FIGS. 9 and 10 of the drawings, the rear wall 13 of the housing 11 may be formed with an extension portion 59 the free end of which can engage the wall. The extension portion thus provides a ramp between the wall and the exposed portion 14 of the insect feeding station over which a liquid trail can be laid to entice ants into the feeding station. With this arrangement, adhesive putty (not shown) can be used to mount the insect feeding station on the wall but it can be hidden behind the rear wall.

Referring now to FIG. 11, a cover 61 can be mounted on the front of the insect feeding station to obscure it from view. This may be desirable at locations where it could be considered unsightly to have an insect feeding station on display. The cover 61 comprises a cover portion 63 and a mounting portion 65 affixed to the cover portion. The mounting portion 65 is adapted to releasably engage the top edge of the front wall 12 to mount the cover in position. The cover can serve to create reduced light conditions within the feeding station, which may be useful if the eradication procedure is directed to insects which have preference for feeding in darkness. The cover can also serve to offer the insect feeding station some protection against the elements (particularly adverse weather conditions) when it is positioned in external locations.

There are possible arrangements other than the cover 61 for protection against the elements. One such arrangement would be a canopy portion (not shown) supported on the exposed portion 14 of the rear wall 13 and extending forwardly so as to overlie the open top end of the upper chamber. The canopy may also extend downwardly to terminate at a location spaced outwardly and downwardly of the upper edge of the front wall 12.

The feeding station of the first embodiment has been described as an arrangement in which a user introduces the toxic liquid into the interior chamber when the feeding station is to be used. In an alternative arrangement, the feeding station can be supplied to the user with toxic liquid contained within the housing. In such an arrangement, the quantity of toxic liquid would be stored in the upper chamber 25 and contained in place by a first removable closure (such as a plug) in the central opening 27 and a second removable closure (such as a tear-off strap) at the top of the upper chamber. When the feeding station is to be used, both of the closures would be removed so allowing the toxic liquid to drain from the upper chamber 25 into the interior region 21.

The embodiment shown in FIG. 12 of the drawings is similar to the first embodiment with the exception that an upstanding formation 67 is provided in each reservoir. The upstanding formation 67 comprises a plurality of spaced apart ribs 69 which are supported on the upperside of each partition 47 and the bottom 19. The ribs 69 extend between the opposed ends of the reservoir and divide the reservoir into sections separated from one another. The ribs also function as landings over which the ants can move to gain access to all of the toxic liquid.

The embodiment shown in FIG. 13 of the drawings is also somewhat similar to the first embodiment with the exception that each partition 47 extends to one side 17 of the interior region and the associated opening 51 is defined between the end of the partition and the other side 17. The partitions 47 are inclined downwardly towards the respective openings 51 and alternate partitions extend to opposed sides 17 of the interior region 21. With this arrangement, the toxic liquid can cascade from one partition to the next partition. Riffles 71 extend across each partition 47 between the front and rear walls of the housing. The riffles 71 are located at spaced intervals along the partition and a reservoir 50 is formed between adjacent riffles. The riffles 71 define weirs over which surplus toxic liquid can flow from one reservoir to another and ultimately to the opening 51. In this embodiment the upper chamber 25 defined above the top wall 23 of the interior region 21 has an opening 73 through which toxic liquid can drain into the interior region 21. There is a separate opening 75 disposed alongside the upper chamber 25 through which ants can enter and leave the interior region 21.

Figure 15:
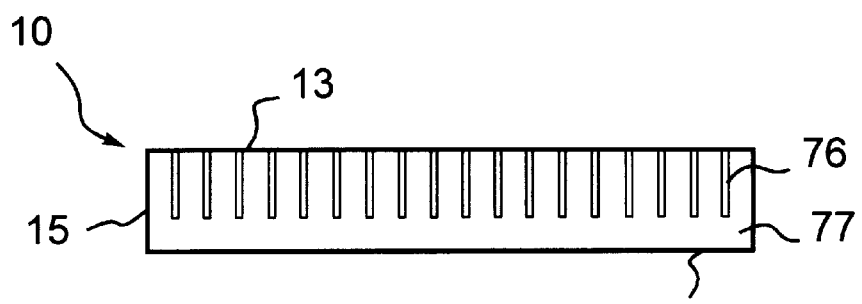
FIG. 15 is a plan view of the insect feeding station of FIG. 14.

In the embodiment shown in FIGS. 14 and 15, the internal structure 43 comprises a plurality of lateral protrusions 76 in the form of slender rods. The rods 76 are each mounted at one end on the rear wall 13 and extend towards but terminate inwardly of the front wall 12 such that a gap 77 is defined between the free ends of the rods and the front wall. The gap 77 provides a path which extends along the front wall and along which ants can pass in a relatively unimpeded manner. This allows able ants to retrieve the bodies of dead ants and remove them from the feeding station without being unduly obstructed by the internal structure.

In this embodiment the protrusions are arranged in an array which comprises a series of rows and columns, however any other arrangement is possible.

Figure 16:
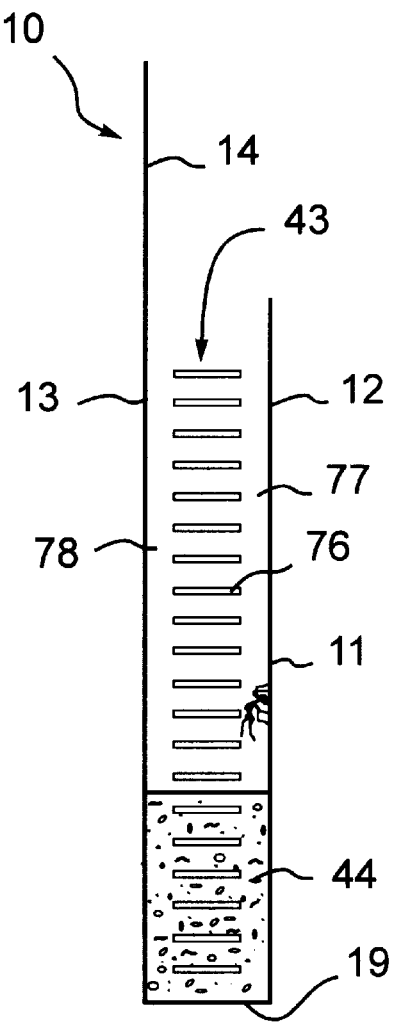
FIG. 16 is a schematic side view of an insect feeding station according to a fifth embodiment.

The embodiment shown in FIG. 16 is similar to the embodiment of FIGS. 14 and 15 with the exception that the internal structure 43 is disposed centrally within the interior region. With this arrangement, the slender rods defining the lateral protrusions 76 terminate inwardly of the rear wall 13 so that a gap 78 is defined between the protrusions and the rear wall in addition to the gap 77 between the protrusions and the front wall 12. The internal structure can be supported in position in any suitable manner such as by connector elements (not shown) extending between the rods. The internal structure may be attached in any suitable manner to the peripheral wall 15, the front wall 12, the rear wall 13 or any combination of such walls.

In another embodiment (not shown), the rods 76 extend to both the front wall 12 and the rear wall 13. With such an arrangement, there is of course no gap between the internal structure and the walls.

In the embodiment shown in FIG. 17, the internal structure 43 comprises a plurality of concave elements 79 each arranged to define a reservoir for containing a portion of the toxic liquid. The elements 79 extend between the front and rear walls of the housing 11 and are arranged in rows which extend between the sides 17, the elements in each row being in spaced apart relation with one another.

The rows are offset one from another so that surplus toxic liquid from one reservoir can cascade into a reservoir in the row immediately below.

In the various embodiments described previously, there is a single interior region 21 between the front and rear walls 12, 13 of the housing 11. In other embodiments there may be a multitude of such interior regions. An example of such an embodiment is illustrated in FIGS. 18, 19 and 20 of the drawings. In this embodiment, the housing 11 comprises the front wall 12, the rear wall 13 and several inner walls 80 between which the interior regions are defined. While not shown in the drawings, the housing 11 is of a similar construction to the first embodiment inasmuch as it has a top wall with a central opening through which ants can enter and leave. Each interior region has an internal structure which in the embodiment is formed by a plurality of lateral protrusions 81 on the front wall 12 and on each internal wall 80. The lateral protrusions 81 on each wall are in the form of block-like structures positioned in spaced apart relationship. In addition to forming the internal structure, the lateral protrusions function as spacers between the various walls. Apertures 83 are provided in each inner wall 80 to provide for liquid communication between the inner regions 21. This allows the liquid level to remain substantially constant in the various liquid regions. The lateral protrusions provide an arrangement on which the ants can crawl for extensive access to the toxic liquid. As the toxic liquid is consumed its level falls and more of the protrusions 81 are exposed. The protrusions provide landings from which ants can feed and on which ants can die. The landings provided by the protrusions also serve to strain the surface of the toxic liquid as its level falls so as to extract at least some of the bodies of dead ants which had previously fallen into the liquid. The bodies of the dead ants are effectively "dry-docked" on the landings from where they can later be retrieved by other ants. The retrieved bodies can be returned to the nest of the ant colony or discarded. If desired, the upper surfaces of the lateral protrusions can be configured to define reservoirs.

In a variation to the preceding embodiment, the apertures 83 are not provided in the inner walls 80. With this arrangement, regions separated from each other by the walls 80 are not in fluid communication with each other.

The embodiment shown in FIGS. 21 and 22 of the drawings is also directed to an insect feeding station in which the internal structure 43 does not define reservoirs for containing the toxic liquid but rather provides an arrangement which ants can crawl on to gain access to the toxic liquid and which can retain the bodies of dead ants. In this embodiment, the internal structure 43 comprises an open porous structure having interstices through which the ants can pass. The open porous structure is formed by a tangled mass of fibrous material. The ants can crawl through the mass of fibrous material and along individual fibres to reach the toxic liquid contained within the housing 11. Because of the nature of the fibrous mass, it provides extensive access for ants to the toxic liquid. The mass of fibrous material can retain the bodies of dead ants in position, however if a body does happen to fall into the liquid it is likely to be caught in a lower section of the fibrous material and so ultimately removed from the toxic liquid when the level thereof falls below the position at which the body of the dead ant is caught. It will be understood that the fibre size of the mass of fibrous material can be selected to provide best results in accordance with the typical size of the type of ant or other insect being targeted. While not shown in the drawings the housing has a top wall incorporating a central opening through which ants can enter and leave the interior region. As with earlier embodiments, the feeding station of this embodiment can be supplied to a user with toxic liquid in the housing if desired. In this instance, the toxic liquid can be contained in the interior region 21 rather than the upper chamber at the point of sale.

The embodiment shown in FIG. 23 is directed to an insect feeding station in which the internal structure 43 comprises an upstanding formation 87 in the form of a wall formation dividing the interior region 21 into a plurality of elongated reservoirs 85 which extend between the opposed sides of the housing and which are in side by side relation. Each reservoir 85 is thin and shallow in relation to its length. The wall formation preferably comprises a plurality of solid walls 89 between which liquid does not flow. As before, while not shown in the drawings, the housing 11 has a top wall incorporating a central opening.

The embodiment shown in FIGS. 24 and 25 is directed to an ant feeding station comprising an inner portion 91 and an outer portion 93 which is adapted to be mounted on the inner portion to provide a cover therefor. The inner portion 91 comprises a body 95 having an interior zone 97 surrounding an inner peripheral wall 99. The inner wall 99 encloses a space 101 which is open at the bottom. The body is supported on feet 102 which provides clearance below the body to provide access for ants to the space 101. The inner wall 99 defines an opening 103 at the upper end of the space 101 which opens onto the interior zone and through which ants can enter and leave the interior region. The body 95 has a plurality of annular reservoirs 105 in a tiered arrangement, with each reservoir being offset in the inward direction in relation to the reservoir immediately below it. The reservoirs are adapted to contain toxic liquid to which the ants can gain access from the inner zone via access openings 106. Each reservoir has a notch 107 which provides a weir from which surplus toxic liquid can flow to the next reservoir. A filling chamber 109 is provided at the top of the body. The filling chamber 109 has a notch 111 which also provides a weir through which toxic liquid can flow into the uppermost reservoir. The notch 111 is relatively small in its flow area with the result that toxic liquid can only drain slowly from the filling chamber, thereby allowing the filling chamber to be filled to a specified level which provides an indication as to the quantity of toxic liquid which should be introduced to fill the reservoirs. In a modified arrangement, the reservoirs may be combined into a continuous helical formation rather than each being of an annular formation. In the modified arrangement, ripples or other elements would be provided to divide the helical formation into sections each of which functions as a reservoir.

The insect feeding station shown in the embodiment of FIGS. 26 and 27 is similar to the first embodiment in that the internal structure 43 comprises a partition structure 45 which divides the interior region 21 into a plurality of feeding compartments 49. In this embodiment, however, the partition structure comprises a plurality of perforated partitions 115 formed of mesh material. The partitions are of such size that ants can pass therethrough to move from feeding chamber to feeding chamber. The perforations are not, however, so large as to prevent ants from easily crawling along the partitions to move within each feeding chamber. The partitions 115 are in spaced apart relationship, the spacing being such that ants on one partition can reach through the perforations in that partition to consume the toxic liquid in the feeding chamber immediately below until the level of the toxic liquid in that chamber falls to the partition at the bottom of the chamber. The ants can then advance into the feeding chamber which they had previously emptied of toxic liquid. In other words, ants can occupy a feeding chamber which they had previously emptied of toxic liquid and consume toxic liquid in the feeding chamber immediately below the chamber that they are occupying. In this way, the ants have access to the toxic liquid for feeding without having to stand in the toxic liquid. The partitions 115 also act as landings on which the bodies of dead ants can be "dry-docked" for subsequent retrieval.

The embodiment shown in FIGS. 28 and 29 is directed to an insect feeding station comprising a housing 11 having a front wall 12, a rear wall 13 and a peripheral wall 15 extending between the front and rear walls. The peripheral wall 15 forms the sides 17 and bottom 19 of the interior region. An interior region 21 is defined between the walls. An internal structure 43 is provided within the interior region. The internal structure 43 comprises an internal wall 120 which is spaced from the front and rear walls and which extends between the sides 17 of the interior region. The internal wall 120 divides the interior region into first and second chambers, being a liquid chamber 121 and a feeding chamber 122. The internal wall 120 has a plurality of small holes 124 formed therein extending between the two chambers. The liquid chamber 121 is adapted to contain toxic liquid and the holes 124 formed in the internal wall 120 are of such a size that toxic liquid can ooze through the holes to form a globule on the internal wall within feeding chamber. Ants 58 within the feeding chambers 122 feed on the globules and in this way have access to the toxic liquid. As the globule at each hole 124 is consumed, another globule develops.

The liquid chamber 121 has a top wall 123 with a central opening 127. An upper chamber 131 is defined above the top wall 123 between the rear wall 13 and the internal wall 120. The upper chamber is open at its top and is adapted to receive a supply of toxic liquid which can then drain into the liquid chamber 121. The opening 127 is of such a size which is sufficiently large to allow drainage of the liquid therethrough but which is sufficiently small to inhibit entry of ants into the liquid chamber. Alternatively, a plug or some other form of closure may be provided for selectively closing the aperture.

The feeding chamber 122 has a top wall 133 with a central opening 137. An upper chamber 138 is defined above the top wall 133 between the front wall 12 and the internal wall 120. The upper chamber 138 is open at its top. A ramp 139 is provided at the top edge of the internal wall 120. The ramp extends rearwardly to the rear wall 13 and provides a pathway for ants to reach the upper chamber 138 from where they can enter and leave the feeding chamber 122 via the opening 137. Because it is required to accommodate passage of ants, the opening 137 is larger than the opening 127. The ramp 139 does not unduly obstruct the open top of the upper chamber 131.

The arrangement in this embodiment where the liquid chamber 121 and the feeding chamber 122 are separated is particularly useful. It ensures that ants in the feeding chamber are separate from the liquid in the feeding chamber. Consequently, dead ants within the feeding chamber can be retrieved with relative ease.

The feeding chamber can serve a secondary function as a basin for capturing any globules which drip from the holes 124 before being consumed.

While the internal wall 120 has been described as being provided with a plurality of small holes, it can be of any other suitable construction which allows toxic liquid to migrate therethrough. For instance, the wall may be formed of woven material in which the weave is sufficiently open to allow migration of the liquid.

In circumstances where ant infestation is extensive, it may be desirable to employ several insect feeding stations. This may be done by positioning two of the insect feeding stations according to any of the embodiments in spaced apart facing relationship with a bridge portion (not shown) connected to, and extending between, the two stations to provide a free-standing unit. Preferably the bridge portion extends between the upper parts of the two stations and provides a cover to afford protection against the elements.

Because of the construction of some of the insect feeding stations according to the embodiments described, there may be some difficulty in cleaning them. To avoid such difficulties, the insect feeding stations can be provided with removable sections which provide easy access to the interior for cleaning purposes. The removable sections may be of any suitable form such as a removable wall panel or an opening with a removable closure. Where an opening with a removable closure is employed, it is conveniently located on the base of the station so that water can be flushed through the station to effect cleaning.

From the foregoing, it is evident that the various embodiments provide insect feeding stations which are simple and convenient to use. The feeding stations are environmentally friendly in the sense that they can be re-used as required and are not intended to be discarded after a single use. Additionally, the feeding stations prolong the life expectancy of the toxic liquid through restricted contact of the liquid with air as compared to the prior art arrangement of a broad shallow vessel, such as a saucer. The longer life expectancy of the liquid results in less wastage which is not only beneficial to the environment but also provides cost savings.

It should be appreciated that the invention is not limited to the scope of the various embodiments described. While many of the embodiments have been described as having an upper chamber for receiving toxic liquid and a central opening through which the toxic liquid can drain from the upper chamber into the interior region, it should be appreciated that such features are only optional. The interior region of each feeding station could simply be open at its upper end to allow for the introduction of toxic liquid into the region as required and to allow ants to enter and leave the region.

We claim:

1. An insect feeding station for administering a fluent substance to insects, comprising a housing having an interior region adapted to contain the substance, the interior region having a bottom wall, means for defining an opening in the housing through which insects can enter the interior region, and an internal structure within the interior region for facilitating access by insects to the substance, and an area within the interior region where in use the substance is contained entirely by side wall means and said bottom wall, said bottom wall having a perimeter which is entirely surrounded by said side wall means, said bottom wall and said side wall means being devoid of any opening therein where the substance is contained, at least part of said internal structure being located within said area and within the confines of said side wall means, said at least part of the internal structure being adapted to be at least partially covered by the substance when the substance is first introduced into the interior region and progressively exposed as the level of the substance at which insects feed progressively falls upon consumption of the substance, wherein said at least part of the internal structure provides a means for straining the surface of the substance at various levels as it progressively falls for removing bodies of insects therefrom to at least inhibit clogging of the substance by said bodies and wherein said at least part of the internal structure being of an open construction having interstices at various levels through which insects can move while being supported on said at least part of the internal structure to obtain access to the substance.

2. An insect feeding station as claimed in claim 1 wherein the internal structure comprises at least one upstanding formation within the interior region for parting the substance.

3. An insect feeding station according to claim 2 wherein the upstanding formation comprises a wall structure dividing the interior region into a plurality of reservoirs each adapted to contain a portion of the substance.

4. An insect feeding station according to claim 3 wherein the or each reservoir is elongated, each being thin and shallow in relation to its length.

5. An insect feeding station according to claim 1 wherein said at least part of the internal structure comprises a mass of fibrous materials.

6. An insect feeding station according to claim 1 wherein said at least part of the internal structure provides a plurality of feeding chambers one above another each for receiving and containing a portion of the substance, at least one feeding chamber comprising a recess having an open top surrounded by a raised periphery for containing the portion of substance received therein.

7. An insect feeding station according to claim 1 wherein said at least part of the internal structure comprises a plurality of perforated partitions in spaced apart relationship, one above another, at least some of the perforations being of a size through which the insects can pass.

8. An insect feeding station according to claim 7 wherein the spacing between adjacent partitions is such that an insect can stand on one partition and consume the substance above the next partition immediately below until at least the level of the substance falls to said next partition.

9. An insect feeding station according to claim 1 wherein said at least part of the internal structure includes a plurality of discrete lateral protrusions extending laterally of said side wall means.

10. An insect feeding station according to claim 8 wherein the lateral protrusions comprise a plurality of slender rods.

11. An insect feeding station according to claim 10 wherein said side wall means include two wall sections in opposing relationship with each other, wherein one wall section having a plurality of slender rods extending therefrom in a direction towards the other wall section and terminating inwardly of the other wall section whereby a gap is defined between said other wall section and said rods.

12. An insect feeding station according to claim 9 wherein the lateral protrusions are arranged to define feeding chambers.

13. An insect feeding station according to claim 1 wherein the housing defines a plurality of interior regions which are positioned one in front of another and each of which has a respective internal structure.

14. An insect feeding station according to claim 1 wherein the interior region has a top wall, an upper chamber being defined in the housing above the top wall.

15. An insect feeding station according to claim 1 wherein the portion of the internal structure which is progressively exposed providing a progressively increasing zone away from the substance and above said bottom wall through which zone insects can move while being supported on said at least part of the internal structure to obtain access to the substance and on which zone bodies of insects can be supported as said bodies are separated from the remaining substance as the level of the substance at which the insects feed progressively falls upon consumption of the substance, said zone being located within the confines of said side wall means.

16. An insect feeding station according to claim 1 wherein said side wall means comprises a front wall and a rear wall in spaced apart relationship to define the interior region, said opening in the housing being defined by and between the front and rear walls and providing a means through which insects can enter and leave the interior region, and a portion of the rear wall extending upwardly beyond the front wall and the opening to define a surface for receiving a substance attractive to insects for the purpose of luring insects through the opening and into the interior region.

17. An insect feeding station according to claim 16 wherein in use a trail of said substance attractive to insects is laid over said surface to terminate at or near said fluent substance contained within the interior region.

18. An insect feeding station according to claim 1 wherein at least part of said opening is in opposed relation to said bottom wall.

19. An insect feeding station according to claim 9 wherein at least some of said lateral protrusions are positioned one above another.

20. An insect feeding station according to claim 1 wherein at least part of the opening is disposed in opposed relation to said bottom wall.

21. An insect feeding station according to claim 1 wherein said side wall means includes two spaced apart external walls, the spacing between the two external walls being small in relation to the depth of the interior region.

22. An insect feeding station according to claim 1 wherein said at least part of said internal structure is located inwardly of said side wall means.

23. An insect feeding station according to claim 1 wherein said straining means inhibits the accumulation of bodies of insects in the substance as the substance is consumed by the insects.

24. An insect feeding station for administering a liquid substance to insects, comprising a housing having an interior region, an internal wall dividing the interior region into first and second chambers, the internal wall having a face exposed to said second chamber, the first chamber being adapted to contain the liquid substance and the second chamber being accessible to insects, and a plurality of holes in the internal wall extending between the two chambers, each hole being so dimensioned that insects within the second chamber are excluded from the first chamber and that in use liquid in the first chamber can ooze through the holes into the second chamber, wherein each hole is so constructed that liquid oozing therethrough forms a liquid globule on said face of the internal wall whereby insects in the second chamber can move along said face to obtain access to liquid globules formed thereon.

25. A feeding station comprising an interior region adapted to contain a substance with a surface thereof exposed, means for defining an entrance opening in the feeding station, the interior region being defined by side wall means and a bottom wall, an area within the interior region where in use the substance is entirely contained by said side wall means and said bottom wall, said bottom wall having a perimeter which is entirely surrounded by said side wall means, said bottom wall and said side wall means being devoid of any opening therein where the substance is contained, an internal structure within the interior region for facilitating access to the substance, and at least part of said internal structure being located within said area, said at least part of the internal structure being of a construction which is adapted to be at least partially covered by the substance when the substance is first introduced into the interior region and which is progressively exposed as the level at which the substance is consumed progressively falls upon consumption of the substance, wherein said at least part of the internal structure provides a means for straining the surface of the substance at various levels as it progressively falls and wherein said at least part of the internal structure being of an open construction having interstices at various levels through which insects can move while being supported on said at least part of the internal structure to obtain access to the substance.

26. An insect feeding station for administering a fluent substance to insects, comprising a housing having an interior region adapted to contain the substance, means for defining an opening in the housing through which insects can enter and leave the interior region, and an internal structure within the interior region for facilitating access by the insects to the substance, the internal structure being of a construction which is adapted to at least be partially covered by the substance when the substance is first introduced into the interior region and which is progressively exposed as the substance is consumed, wherein the interior region has a wall and wherein the internal structure includes a plurality of discrete protrusions extending substantially laterally of said wall for inhibiting the accumulation of bodies of insects in the substance as the substance is consumed, at least some of the protrusions being positioned one above another, wherein at least part of the internal structure being of an open construction having interstices at various levels through which insects can move while being supported on said at least part of the internal structure to obtain access to the substance.

27. An insect feeding station according to claim 26 wherein said protrusions comprise slender rods.

28. An insect feeding station for administering a fluent substance to insects, comprising a housing having an interior region adapted to contain the substance, the interior region having a bottom wall, means for defining an opening in the housing through which insects can enter the interior region, and an internal structure within the interior region for facilitating access by insects to the substance, and an area within the interior region where in use the substance is contained entirely by side wall means and said bottom wall, said bottom wall having a perimeter which is entirely surrounded by said side wall means, said bottom wall and said side wall means being devoid of any opening therein where the substance is contained, at least part of said internal structure being located within said area and within the confines of said side wall means, said at least part of the internal structure being adapted to be at least partially covered by the substance when the substance is first introduced into the interior region and progressively exposed as the level of the substance at which insects feed progressively falls upon consumption of the substance, said at least part of the internal structure comprising means for inhibiting the accumulation of bodies of insects in the substance as the substance is consumed by the insects, said at least part of the internal structure comprising a plurality of internal walls defining discrete reservoirs in spaced apart relationship, each reservoir being adapted to receive and contain a portion of the substance with a surface thereof exposed.

29. An insect feeding station according to claim 28 wherein the reservoirs are so arranged that any surplus of the substance can flow from one reservoir to another.

30. An insect feeding station according to claim 28 wherein the reservoirs each being so dimensioned that the substance contained therein is shallow in relation to the area of the exposed surface of the substance.

31. An insect feeding station according to claim 28 wherein each reservoir being small in relation to the interior region such that the substance contained therein can be consumed prior to clogging of the reservoir by the bodies of insects.

32. An insect feeding station according to claim 31 wherein at least some of the reservoirs are located one above another whereby the substance introduced into the interior region can overflow from one reservoir to another reservoir located therebelow.

* * * * *